(12) United States Patent
Czainski

(10) Patent No.: US 9,789,778 B2
(45) Date of Patent: Oct. 17, 2017

(54) CIRCUIT ARRANGEMENT FOR PROVIDING A DC VOLTAGE IN A VEHICLE AND METHOD OF OPERATING A CIRCUIT ARRANGEMENT

(71) Applicant: Bombardier Transportation GmbH, Berlin (DE)

(72) Inventor: Robert Czainski, Szczecin (PL)

(73) Assignee: Bombardier Transportation GmbH, Berlin (DE)

( * ) Notice: Subject to any disclaimer, the term of this patent is extended or adjusted under 35 U.S.C. 154(b) by 177 days.

(21) Appl. No.: 14/646,871

(22) PCT Filed: Nov. 25, 2013

(86) PCT No.: PCT/EP2013/074531
§ 371 (c)(1),
(2) Date: May 22, 2015

(87) PCT Pub. No.: WO2014/079994
PCT Pub. Date: May 30, 2014

(65) Prior Publication Data
US 2015/0360574 A1     Dec. 17, 2015

(30) Foreign Application Priority Data

Nov. 26, 2012    (GB) .................................. 1221231.2

(51) Int. Cl.
*B60L 1/00*    (2006.01)
*B60L 11/18*    (2006.01)
(Continued)

(52) U.S. Cl.
CPC ......... *B60L 11/182* (2013.01); *B60L 11/1812* (2013.01); *B60R 16/02* (2013.01);
(Continued)

(58) Field of Classification Search
CPC .. Y02T 10/7241; Y02T 90/127; B60L 11/182; B60L 2200/18; B60L 2210/12;
(Continued)

(56) References Cited

U.S. PATENT DOCUMENTS

| 5,831,841 A | 11/1998 | Nishino |
| 6,307,357 B1 | 10/2001 | Botti et al. |

(Continued)

FOREIGN PATENT DOCUMENTS

| CN | 102157973 A | 8/2011 |
| CN | 102695629 A | 9/2012 |

(Continued)

OTHER PUBLICATIONS

Sebastian et al.; "Improving Dynamic Response of Power Factor Correctors by Using Series-Switching Post-Regulator"; 13th Annual Applied Power electronics Conference and Exposition; Feb. 15, 1998, pp. 441-446; New York, NY.

(Continued)

*Primary Examiner* — Jared Fureman
*Assistant Examiner* — Duc M Pham
(74) *Attorney, Agent, or Firm* — The Webb Law Firm

(57) ABSTRACT

A circuit arrangement for providing a DC voltage in a vehicle and a method for operating the circuit arrangement. The circuit arrangement includes at least one secondary-sided inductance of a vehicle-sided pick-up portion for receiving a magnetic field and for producing an electric output voltage, at least one rectifier for rectifying the output voltage of the at least one inductance, and at least one source element or drain element. The rectifier and the source element are connected such that an output voltage of the circuit arrangement is a sum of an output voltage of the rectifier and an output voltage of the source element or the rectifier and the drain element are connected such that an (Continued)

output voltage of the circuit arrangement is a difference between an output voltage of the rectifier and an input voltage of the drain element.

10 Claims, 9 Drawing Sheets

(51) Int. Cl.
*H02J 5/00* (2016.01)
*H02J 7/02* (2016.01)
*B60R 16/02* (2006.01)
*H02M 1/00* (2006.01)

(52) U.S. Cl.
CPC .............. *H02J 5/005* (2013.01); *H02J 7/025* (2013.01); *B60L 2200/18* (2013.01); *B60L 2200/26* (2013.01); *B60L 2210/12* (2013.01); *B60L 2210/14* (2013.01); *B60L 2210/30* (2013.01); *B60L 2210/40* (2013.01); *B60L 2260/52* (2013.01); *B60L 2260/54* (2013.01); *H02M 2001/0077* (2013.01); *H02M 2001/0093* (2013.01); *Y02T 10/7005* (2013.01); *Y02T 10/7072* (2013.01); *Y02T 10/7225* (2013.01); *Y02T 10/7233* (2013.01); *Y02T 10/7241* (2013.01); *Y02T 90/122* (2013.01); *Y02T 90/127* (2013.01); *Y02T 90/14* (2013.01)

(58) Field of Classification Search
CPC ....... B60L 2260/52; H02J 5/005; H02J 7/025; H02M 2001/0077; B60R 16/02

USPC ........................................................ 307/104
See application file for complete search history.

(56) References Cited

U.S. PATENT DOCUMENTS

| | | | |
|---|---|---|---|
| 6,499,701 B1 | 12/2002 | Thornton et al. | |
| 2003/0038612 A1 | 2/2003 | Kutkut | |
| 2010/0097031 A1* | 4/2010 | King ................... | B60L 11/1803 320/109 |
| 2011/0181240 A1 | 7/2011 | Baarman et al. | |
| 2013/0038277 A1* | 2/2013 | Chan ...................... | H02J 7/025 320/108 |

FOREIGN PATENT DOCUMENTS

| | | | | |
|---|---|---|---|---|
| EP | 0401448 A1 | 12/1990 | | |
| FR | 2624281 | * 12/1987 | ............... | G05F 1/62 |
| FR | 2624281 A1 | 6/1989 | | |
| LU | 44443 A1 | 11/1963 | | |
| TW | 201141006 A1 | 11/2011 | | |

OTHER PUBLICATIONS

Hernando et al.; "Improving Dynamic Response of Power-Factor Correctors by Using Series-Switching Postregulator"; IEEE Transactions on Industrial Electronics, Jun. 1999; pp. 563-568; vol. 46.3.

* cited by examiner

State of the art

CIRCUIT ARRANGEMENT FOR PROVIDING A DC VOLTAGE IN A VEHICLE AND METHOD OF OPERATING A CIRCUIT ARRANGEMENT

CROSS-REFERENCE TO RELATED APPLICATIONS

This application is the United States national phase of International Application No. PCT/EP2013/074531 filed Nov. 25, 2013, and claims priority to United Kingdom Patent Application No. 1221231.2 filed Nov. 26, 2012, the disclosures of which are hereby incorporated in their entirety by reference.

BACKGROUND OF THE INVENTION

Field of the Invention

The invention relates to a circuit arrangement for providing a desired DC voltage, in particular a voltage for charging a traction battery, in a vehicle. Furthermore, the invention relates to a vehicle, in particular a road automobile or a rail vehicle, comprising said circuit arrangement. In addition, the invention relates to a method of operating said circuit arrangement.

Description of Related Art

Vehicles, in particular electric land vehicles, may be provided with energy in different manners. One option is to charge an energy storage on-board the vehicle while the vehicle stops and by using an electric cable connection. According to another option, the energy is transferred to the vehicle in a wireless manner using a magnetic field which induces an electric voltage in at least one inductance on-board the vehicle. The expression "pick-up" or "receiver" has been used for the device which comprises at least one inductance. Electric vehicles may comprise a so-called traction battery. The traction battery provides electric energy to power or to propel the vehicle. The electric energy stored in the traction battery can be dissipated by an electric machine which propels the electric vehicle. It is therefore necessary to charge the traction battery in order to provide sufficient electric energy to propel the electric vehicle.

One option to charge the traction battery is to use an external source of electric energy, e.g. an external electrical network. For example, the aforementioned wireless manner uses a magnetic field to transfer electric energy from a route-sided primary winding structure to a vehicle-sided secondary winding structure, wherein an alternating voltage is induced on-board the vehicle. This alternating voltage has to be transformed such that a traction battery can be charged.

An example is described in U.S. Pat. No. 6,499,701. The document shows a circuit model for a system transferring power to an electric vehicle. An AC power signal energizes a transmission line that runs along the vehicle guideway. A ferromagnetic pick-up forms, together with the transmission line, a primary and a secondary winding, as with a conventional transformer. The AC voltage from the pick-up is rectified by a diode bridge, filtered by an inductor and a capacitor, and regulated by a buck converter so as to provide a constant DC voltage to a load.

A disadvantage of the shown solution is that significant losses are caused, in particular at a beginning of a charging procedure when a high power level is necessary. These losses can only be reduced by complex and costly circuit arrangements.

TW 201 141 006 A discloses a vehicle induction charging method including a power supply device and a power receiving device. The power supply device detects whether or not a power receiving device enters into the induction range through a first frequency-changing power supply module corresponding to a first power receiving module of the power receiving device. Furthermore, the received power and the regulated output power can be checked by a power receiving device power state data code. Since the power receiving module utilizes series connection to increase the total voltage in charging a vehicle, there is no need to use components of high-voltage specification.

US 2003/038612 A1 discloses A simple and flexible battery charger for charging high voltage battery strings includes a DC-to-AC converter that drives the primary of a transformer having multiple secondaries. Each secondary winding has a corresponding output stage formed of a rectification circuit, output inductor, and output capacitor. The output terminals of the output stages are connectable either in parallel or series.

U.S. Pat. No. 5,831,841 A discloses primary inductive path to which a high-frequency current is supplied from a power supply is laid along a guide rail for carrying car bodies and secondary electric power receiving circuit for receiving electric power from the primary inductive path in a contactless mode are disposed in the car bodies.

LU 44 443 A1 discloses a device for holding constant a voltage provided by a battery. A DC auxiliary voltage is generated via a DC converter from an output voltage of the battery, wherein the auxiliary voltage is connected in series to the output voltage of the battery.

FR 2 624 281 A discloses a stabilized power supply which has a main transformer followed by a single or multiphase rectifier and an integrator.

The document "Sebastian J. et. al., Improving Dynamic Response of Power Factor Correctors by Using Series-Switching-Post-Regulator, APEC '98, 13th Annual Applied Power Electronics Conference and Exposition, Anaheim, Calif., Febr. 15-19, 1998, New York, N.Y.: IEEE, US, 15 Feb. 1998, pages 441-446" discloses a method to improve the dynamic response of power factor correctors based on a series switching post-regulator.

SUMMARY OF THE INVENTION

It is an object of the present invention to provide an electric circuit arrangement for providing a desired direct current (DC) voltage, in particular a DC voltage for charging a traction battery, which can be used in vehicles comprising an inductive pick-up arrangement for receiving electric energy via a magnetic field and which reduces power losses, costs, and weight of the circuit arrangement. It is a further object of the invention to provide a vehicle, in particular a road automobile or a rail vehicle, which comprises the proposed circuit arrangement. In addition, it is an object of the present invention to provide a method of operating said electric circuit arrangement.

According to a basic idea of the present invention, a circuit arrangement for providing a desired direct current (DC) voltage, in particular a DC voltage for charging a traction battery, in a vehicle is proposed. In addition or alternatively, the DC voltage can be used for other purposes, e.g. driving an electric machine or supply other electric or electronic devices of the vehicle.

The present invention can be applied to any land vehicle (including, but not preferably, any vehicle which is only temporarily on land, in particular track bound vehicles, such as rail vehicles (e.g. trams), but also to road automobiles, such as individual (private) passenger cars or public transport vehicles (e.g. busses, including trolley busses which are also track bound vehicles).

Such a traction battery provides electric power to propel the vehicle. The electric vehicle can be a road automobile or a rail vehicle. For example, the electric vehicle can comprise a power converter which is connected to the traction battery and to an electric machine which propels the vehicle. The power converter can invert a DC voltage, a so called traction voltage, provided by the traction battery to power the electric machine.

The circuit arrangement comprises at least one secondary-sided inductance of a vehicle-sided pick-up portion or receiver. The pick-up portion, in particular the inductance, serves for receiving a magnetic field and for producing an electric output voltage. Via the pick-up portion electric energy can be transferred from e.g. a route-sided transmission line that runs along a vehicle guideway (primary side) to the electric vehicle (secondary side). The pick-up portion therefore forms a secondary part of a transformer. The electric output voltage of the secondary-sided inductance or the pick-up portion is an AC voltage or alternating voltage. The inductance can be provided by a winding structure.

Furthermore, the circuit arrangement comprises at least one rectifier for rectifying the output voltage of the at least one inductance. The expression rectifier relates to a circuit arrangement to rectify an alternating input voltage into a direct output voltage.

Furthermore, the proposed circuit arrangement comprises at least one source element. Alternatively or in addition to the source element, the proposed circuit arrangement comprises at least one drain element. The source element is an element which provides or generates an additional voltage. The voltage of the source element can be added to an output voltage of the rectifier. It is also possible that the source element provides additional electric energy while charging the traction battery connected to the proposed circuit arrangement.

The drain element is an element which captures a voltage. The captured voltage can reduce the output voltage of the rectifier. It is also possible that the drain element dissipates excess electric energy while charging the traction battery connected to the proposed circuit arrangement.

Further, the rectifier and the source element are connected such that an output voltage of the circuit arrangement is a sum of an output voltage of the rectifier and an output voltage of the source element. The input side and output side of the source element are defined with respect to an energy flow through the source element during an operation of the respective element, wherein the energy flows from the input side to the output side. Accordingly, the output voltage of the source element is the voltage provided at the output side of the source element.

If the circuit arrangement comprises a drain element, the rectifier and the drain element are connected such that an output voltage of the circuit arrangement is a difference between the output voltage of the rectifier and an input voltage of the drain element. The input side and output side of the drain element are defined with respect to an energy flow through the drain element during an operation of the respective element, wherein the energy flows from the input side to the output side. Accordingly, the input voltage of the drain element is the voltage falling across the input side of the drain element.

For determination of the output voltage of the circuit arrangement, i.e. if the output voltage of the circuit arrangement is a sum of two voltages or a difference between two voltages, a polarization-sensitive view is chosen. This means that a voltage drop, e.g. of a voltage falling across output terminals of the source element or across input terminals of the drain element, is directed from a high potential to a low potential.

The proposed circuit arrangement advantageously allows providing a constant or nearly constant output voltage of the circuit arrangement, e.g. a voltage for charging a traction battery, in the case that the output voltage of the rectifier varies, e.g. due to varying operation parameters.

Further, the proposed circuit arrangement comprises at least one voltage converter.

According to the invention, the voltage converter provides the aforementioned source element. If the circuit arrangement comprises a drain element, the said voltage converter can alternatively or additionally provide the drain element. It is possible that one voltage converter can be operated in a source mode as a source element and in a drain mode as a drain element. In this case, output terminals of the voltage converter operated in the source mode can be equal to input terminals of the voltage converter operated in the drain mode. It is, however, also possible that the circuit arrangement comprises a first voltage converter providing the source element and a second voltage converter providing the drain element.

The voltage converter can transform a direct input voltage with the given level to a direct output voltage with a desired level. Known voltage converters are for example a so-called step-down converter or buck converter, a so-called step-up converter or boost converter, and a so-called buck-boost-converter. Another known voltage converter is the so-called resonant converter. Resonant converters or resonant power converters contain resonant LC networks whose voltage and current wave forms vary sinusoidally during one or more sub-intervals of each switching period. Also, resonant converters comprise a transformer. Known resonant topologies comprise for example series resonant converter, a parallel resonant converter, and a so-called series parallel resonant converter.

If the voltage converter provides a source element, the rectifier and the voltage converter are electrically connected such that an output voltage of the circuit arrangement is a sum of the output voltage of the rectifier and the output voltage of the voltage converter. In contrast to known solutions, for example the solution proposed in U.S. Pat. No. 6,499,701, the output voltage of the circuit arrangement, which can be a charging voltage for the traction battery, is not equal to the output voltage of the voltage converter but is composed of the output voltage of the rectifier and the output voltage of the voltage converter. This advantageously allows designing the voltage converter such that only a part of a desired charging voltage needs to be provided by the voltage converter. This, in turn, allows choosing cheaper, lighter, and less bulky elements to design the voltage converter.

If the voltage converter provides a drain element, the rectifier and the voltage converter are electrically connected such that an output voltage of the circuit arrangement is a difference between the output voltage of the rectifier and the input voltage of the voltage converter.

In all configurations, the output voltage of the circuit arrangement is a DC voltage.

In another embodiment, the output voltage of the rectifier is equal to an input voltage of the source element, e.g. a first voltage converter. Input terminals of the voltage converter can e.g. be connected to output terminals of the rectifier.

Also, the output voltage of the rectifier can be equal to an output voltage of the drain element. The drain element can be provided by the first voltage converter or another voltage converter which is operated in a drain mode.

This advantageously provides a simple electric connection or electric design of the proposed circuit arrangement. Although the input voltage of the voltage converter is the output voltage of the rectifier, the voltage converter and its elements only need to be designed such that a part of the charging voltage needs to be provided by the voltage converter. This provides the aforementioned advantages of the proposed circuit arrangement.

In an alternative embodiment, an output voltage of the circuit arrangement is equal to an input voltage of the source element and/or an output voltage of the drain element. This advantageously provides an alternative but also simple electric connection or electric design of the proposed circuit arrangement.

In another embodiment, an output of the rectifier is connected in series to an output of the source element and/or an input of the drain element. In this embodiment, the output voltage of the circuit arrangement is equal to the sum of the output voltage of the rectifier and the output voltage of the source element or the difference between the output voltage of the rectifier and the input voltage of the drain element, wherein a polarization of the voltages falling across output terminals of the source element or input terminals of the drain element is considered. If the output voltage of the circuit arrangement is the charging voltage of the traction battery, the charging voltage is composed as the sum of or the difference between the aforementioned voltages. This electric layout of the proposed circuit arrangement advantageously allows a simple adjustment or control of the output voltage as it can be calculated as a simple sum of two voltages.

In another embodiment, a configuration of the voltage converter is chosen depending on a ratio of a desired output voltage of the circuit arrangement and the output voltage of the rectifier. In particular, the configuration of the voltage converter can be chosen depending on a ratio of a desired output voltage of the circuit arrangement and the minimal and maximal output voltage of the rectifier. The configuration of the voltage converter can also depend on the connection of the rectifier and the voltage converter. The term "configuration" refers to the mode(s) of operation in which the converter can be operated. Modes of operation can be categorized with respect to a voltage conversion capability, e.g. if the converter can be operated as a buck converter, a boost converter and/or a buck-boost converter. Alternatively or in addition, the modes of operation can be categorized with respect to an energy directing capability, e.g. if the converter allows unidirectional or bidirectional energy flow.

The configuration of the voltage converter can be chosen such that the voltage converter can be operated as a step-down converter, a step-up converter or a buck-boost-converter. If, for example, the voltage converter provides a source element and the output voltage of the rectifier is equal to an input voltage of the voltage converter, the voltage converter has to be designed as a voltage converter being operable as a step-down converter if the minimal and the maximal output voltage of the rectifier is lower than the desired output voltage of the circuit arrangement but higher than the half of the desired output voltage of the circuit arrangement.

In a preferred embodiment, the voltage converter is designed as a bidirectional voltage converter which can be operated as a buck-boost-converter. Such a voltage converter allows a bidirectional transfer of electric energy while also being operable as a step-down converter or a step-up converter. Such a design of the voltage converter advantageously allows using the voltage converter for a plurality of ratios of a desired output voltage of the circuit arrangement and the output voltage of the rectifier.

In another embodiment, the arrangement further comprises a traction battery, wherein the traction battery is connected to an output of the circuit arrangement. In this case, the voltage, which falls across the traction battery (battery voltage), is equal to the sum or the difference of the output voltage of the rectifier and the output voltage of the voltage converter.

In another embodiment, the voltage converter is designed as a resonant converter. The resonant converter can comprise an inverter which transforms a direct input voltage of the resonant converter into an alternating intermediate voltage. Furthermore, the resonant converter can comprise a transformer which transforms the intermediate voltage at a given level to a desired level. Furthermore, the resonant converter can comprise a rectifier which transforms the transformed intermediate voltage to a direct output voltage of the resonant converter.

In combination with the aforementioned electric circuit arrangement, the inverter of the resonant converter and its elements can advantageously be designed for small input currents. This, in turn, reduces costs, weight, and space requirements of the elements of the inverter. Another advantage if using such a resonant converter is that a turn rate or a winding rate of the transformer can be small. This is because only a part of the electric power to charge the traction battery needs to be provided by the resonant converter. In consequence, this allows e.g. using a small number of windings on a secondary side of the transformer, which in turn reduces again costs, weight, and space requirements. Also, a cable cross-section, in particular of primary-sided cables of the transformer, can be small as less electric power needs to be transformed.

Another advantage is that the rectifier of the resonant converter can be build using MOS-elements which can be operated with little power losses. This, in turn, reduces a total power loss while charging the traction battery.

In an alternative embodiment, the voltage converter is designed as a step-down converter. A step-down converter is referred to as a circuit arrangement which transforms a direct input voltage at a given level to a direct output voltage with a level smaller than the level of the input voltage. For example, a step-down converter can comprise a switch, e.g. a transistor or a diode, an inductor and a capacitor.

A first input terminal, e.g. a positive input terminal, of the step-down converter can be connected to a first, e.g. positive, output terminal of the rectifier. A second, e.g. negative, input terminal can be connected to ground. A first output terminal of the step-down converter can be connected to the second, e.g. negative, output terminal of the rectifier. In this case, a second output terminal of the step-down converter can be connected to the negative terminal of the traction battery. This connection can also be at ground level. In this case, the positive terminal of the traction battery can also be connected to the first, e.g. positive, output terminal of the rectifier.

A positive terminal denotes a terminal providing a potential which is higher than a corresponding negative terminal. E.g. is a potential of the positive output terminal of the rectifier higher than the potential of the negative output of the rectifier. Also, the potential of the positive input terminal of the step-down converter is higher than the potential of the negative input terminal of the step-down converter.

The proposed arrangement advantageously allows setting up the proposed circuit arrangement with available and known electric elements.

In an alternative embodiment, the voltage converter is designed as a buck-boost converter. A buck-boost converter transforms a positive direct input voltage into a negative direct output voltage without a galvanic insulation. A buck-boost converter can comprise a switch, an inductance, a capacitance and a diode.

A first, e.g. positive, input terminal of the buck-boost converter can be connected to a first, e.g. positive, output terminal of the rectifier. A first, e.g. negative, output terminal of the buck-boost converter can be connected to a negative terminal of the traction battery. In this case, a second, e.g. negative, input terminal of the buck-boost converter can be connected to ground. Also, a second, e.g. positive, output terminal of the buck-boost converter can be connected to ground.

The proposed arrangement advantageously provides an alternative arrangement of the converter within the proposed circuit arrangement.

Also proposed is a vehicle, in particular an electric land vehicle such as a road automobile or a rail vehicle. The vehicle comprises one of the previously circuit arrangements. The vehicle can travel on a driving surface of a route, in particular the driving surface provided by a road or a track, and energy can be transferred to the vehicle by the aforementioned electromagnetic field. Energy can be transferred while the vehicle is moving (dynamic transfer, e.g. dynamic charging) or at a halt (static transfer, e.g. static charging). The electric conductor arrangement can also be referred to as transmitter. An alternating electric voltage is produced by magnetic induction in case the vehicle travels or stands on a surface comprising a conductor creating a magnetic field.

In particular, the vehicle comprises a pick-up portion with at least one (secondary-sided) inductance for receiving the magnetic field and for producing an alternating electric output voltage. The produced electric output voltage can be transformed by the proposed circuit arrangement to a desired DC voltage, in particular to a desired charging voltage of a traction battery of the vehicle. The pick-up portion comprising the circuit arrangement can e.g. be mounted at the bottom of the vehicle. It is also possible that the pick-up portion can be moved by an actuator in a vertical direction wherein the vertical direction is perpendicular to a surface plane on which the vehicle travels. This advantageously allows modifying an input voltage of the circuit arrangement such that the input voltage falls within a predetermined voltage interval.

Furthermore, a method of operating one of the previously described circuit arrangements is proposed. At least one secondary-sided inductance of a pick-up portion receives a magnetic field and produces an output voltage. At least one rectifier rectifies the output voltage of the at least one inductance. Further, at least one source element is operated such that a sum of an output voltage of the rectifier and an output voltage of the source element is regulated according to desired parameters or at least one drain element is operated such that a difference between an output voltage of the rectifier and an input voltage of the drain element is regulated according to desired parameters. Parameters denote e.g. a level of the voltage and/or time periods during which a desired output voltage is produced. Also, the source element and/or the drain element can be operated such that a desired voltage curve is produced.

In another embodiment, the source element and/or the drain element is/are provided by at least one voltage converter, wherein the voltage converter converts an input voltage of the voltage converter. The voltage converter is operated such a sum of the output voltage of the rectifier and the output voltage of the voltage converter or a difference between the output voltage of the rectifier and the input voltage of the voltage converter is/are regulated according to desired parameters. Hence, the voltage converter is operated such that the output voltage of the circuit arrangement is regulated according to desired parameters.

This advantageously allows charging the traction battery with a desired voltage level or a desired voltage course.

In another embodiment, the source element and/or the drain element is/are operated such that the output voltage of the circuit arrangement is regulated to a desired level. As the output voltage of the rectifier can change during operation, e.g. due to variations of a primary current in the primary winding structure and/or variations of an mechanical clearance, i.e. the air gap, between the primary windings and the secondary windings and/or other reasons such as weight of the passengers, rail or wheel wear, reduced tire air pressure (in e.g. busses and cars), oscillations in the vehicle suspension and/or wayside curvature, the output voltage of the voltage converter needs to be regulated such that a constant output voltage of the circuit arrangement which can be equal to a charging voltage of the traction battery is provided.

Generally, a circuit arrangement is proposed for charging a battery. The circuit arrangement comprises input terminals for receiving an alternating input voltage. Furthermore, the circuit arrangement comprises at least one rectifier for rectifying the input voltage. Furthermore, the circuit arrangement comprises at least one source element and/or drain element, e.g. a voltage converter. The rectifier and source element are connected such that an output voltage of the circuit arrangement, which can be charging voltage for the battery, is a sum of the output voltage of the rectifier and the output voltage of the source element. Also, the rectifier and the drain element are connected such that an output voltage of the circuit arrangement is a difference between the output voltage of the rectifier and the input voltage of the drain element. The proposed circuit arrangement serves as a charging circuit arrangement for a battery, in particular for batteries which are charged with a high charging power. The proposed circuit arrangement advantageously allows using electric elements, e.g. elements of the proposed voltage converter, which are cheaper, smaller and require less space in order to provide at least one part of a charging voltage for the battery. The proposed charging circuit arrangement can be used in arbitrary applications where an alternating input voltage needs to be transformed such that a desired constant charging voltage is produced.

BRIEF DESCRIPTION OF THE DRAWINGS

Examples of the invention will be described with references to the attached figures. The figures show.

DETAILED DESCRIPTION OF THE INVENTION

Figure 1:
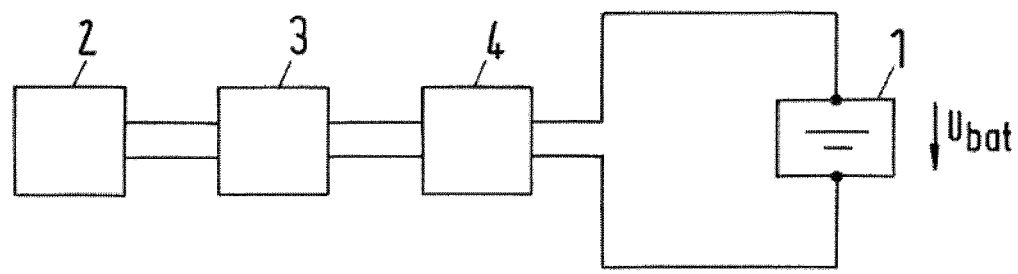
FIG. 1 a schematic block diagram of a circuit arrangement for charging a traction battery according to the state of the art, FIG. 2a a schematic block diagram of a first circuit arrangement according to the invention, FIG. 2b a schematic block diagram of another circuit arrangement according to the invention, FIG. 3 a schematic block diagram of a resonant converter, FIG. 4 a schematic block diagram of a circuit arrangement using a step-down converter, FIG. 5a a schematic operational diagram of the circuit arrangement shown in FIG. 2a with the voltage converter being operated in a source mode, FIG. 5b a schematic operational diagram of the circuit arrangement shown in FIG. 2a with the voltage converter being operated in a drain mode, FIG. 6a a schematic operational diagram of the circuit arrangement shown in FIG. 2b with the voltage converter being operated in a source mode, FIG. 6b a schematic operational diagram of the circuit arrangement shown in FIG. 2b with the voltage converter being operated in a drain mode, FIG. 7 a schematic block diagram of a charging circuit arrangement, FIG. 8 a schematic block diagram of a first step-down converter with galvanic separation, FIG. 9 a schematic block diagram of a second step-down converter with galvanic separation, FIG. 10 a schematic block diagram of a third step-down converter with galvanic separation, FIG. 11 a schematic block diagram of a fourth step-down converter with galvanic separation, and FIG. 12 a schematic block diagram of a universal converter with galvanic separation.

FIG. 1 shows a schematic block diagram of a circuit arrangement for charging a traction battery 1 of an electric vehicle. The circuit arrangement comprises a secondary-sided inductance 2 of a pick-up portion (not shown). The secondary-sided inductance 2 receives a magnetic field and produces an electric output voltage which is an alternating voltage. Furthermore, the circuit arrangement comprises a rectifier 3 for rectifying the output voltage of the inductance 2. Also, the circuit arrangement comprises a voltage converter 4 which transforms the direct or constant output voltage of the rectifier 3 at a given voltage level to a direct or constant voltage with a desired level which is consequently used to charge the battery 1. Therefore, a battery voltage $U_{bat}$ is equal to an output voltage of the voltage converter 4.

Figure 2A:
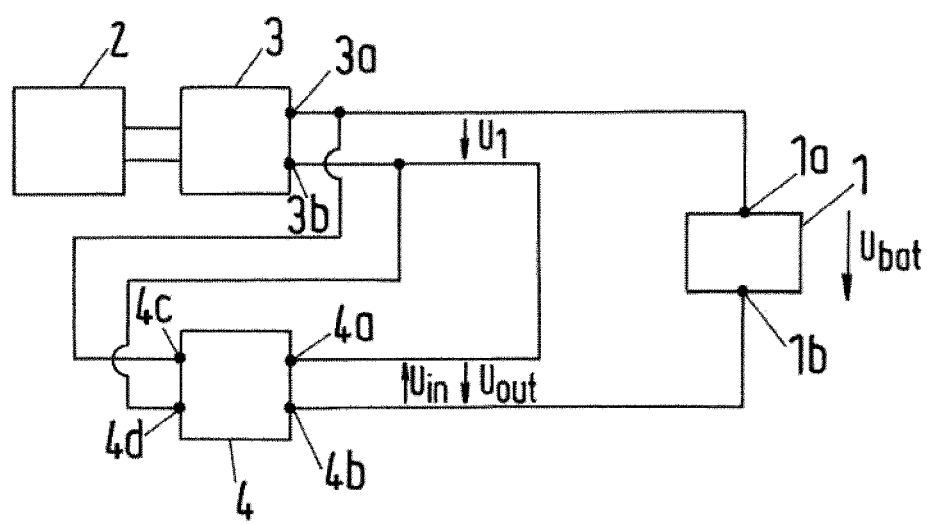

FIG. 2a shows a schematic block diagram of a first circuit arrangement according to the invention. The circuit arrangement comprises a traction battery 1, a secondary-sided inductance 2 which can e.g. be provided by a winding structure, a rectifier 3, and voltage converter 4. An output voltage of the rectifier 3 is denoted by $U_1$ and falls across a first output terminal 3a and a second output terminal 3b of the rectifier 3. The output voltage $U_1$ of the rectifier 3 is a voltage generated by the rectifier by rectifying an alternating input voltage provided by the inductance 2 during inductive power transfer.

If the converter 4 is operated in source mode, e.g. provides a source element, an output voltage of the converter 4 is denoted by $U_{out}$ and falls across a first terminal 4a and a second terminal 4b of the converter 4. The output voltage $U_{out}$ is directed from the first terminal 4a to the second terminal 4b. In this case, the first terminal 4a and the second terminal are output terminals of the converter 4. If the converter 4 is operated in drain mode, e.g. provides a drain element, an input voltage of the converter 4 is denoted by $U_{in}$ and falls across the first terminal 4a and the second terminal 4b of the converter 4. The input voltage $U_{out}$ is directed from the second terminal 4b to the first terminal 4a. In this case, the first terminal 4a and the second terminal are input terminals of the converter 4.

A battery voltage $U_{bat}$ which serves for charging the battery 1 is equal to the sum of the output voltage $U_1$ of the rectifier 3 and the output voltage $U_{out}$ of the converter 4 if the converter 4 is operated in the source mode. Alternatively, the battery voltage $U_{bat}$ is equal to the difference between the output voltage $U_1$ of the rectifier 3 and the input voltage $U_{in}$ of the converter 4 if the converter 4 is operated in the drain mode. It is shown that the first output terminal 3a of the rectifier 3 is connected to a third terminal 4c of the converter 4. Also, the second output terminal 3b of the rectifier 3 is connected to a fourth terminal 4d of the converter 4. If the converter 4 is operated in a source mode, the terminals 4c, 4d are input terminals of the converter 4. In this case, the output voltage $U_1$ of the rectifier 3 is an input voltage of the converter 4. If the converter 4 is operated in a drain mode, the terminals 4c, 4d are output terminals of the converter 4. In this case, the output voltage $U_1$ of the rectifier 3 is equal to an output voltage of the converter 4. The first output terminal 3a of the rectifier 3 is also connected to a positive input terminal 1a of the traction battery 1. A negative input terminal 1b of the traction battery 1 is connected to the second terminal 4b of the converter 4. The battery voltage $U_{bat}$ falls across the terminals 1a, 1b of the traction battery 1 and is directed from the positive input terminal 1a to the negative input terminal 1b of the traction battery 1.

Figure 2B:
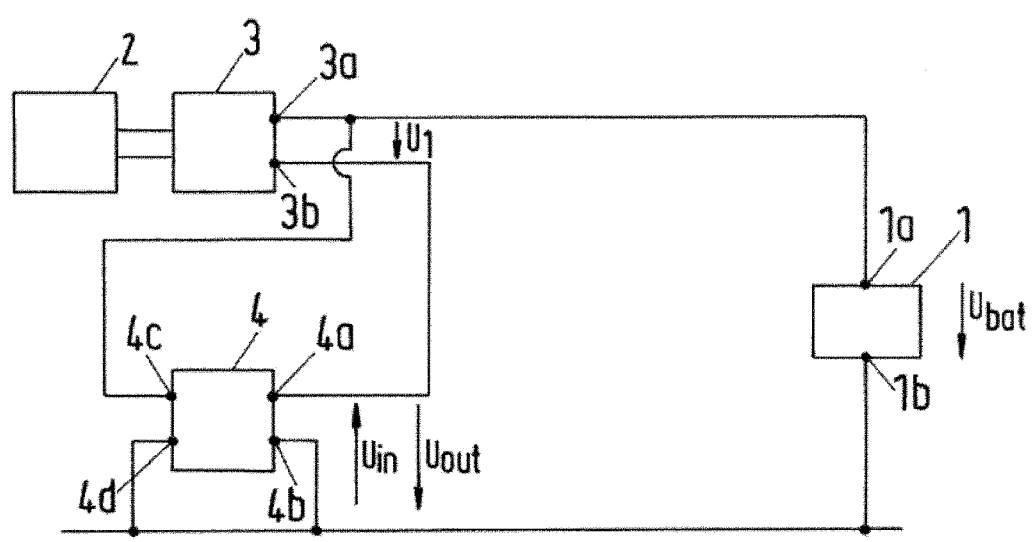

FIG. 2b shows a schematic block diagram of another circuit arrangement according to the invention. In contrast to the circuit arrangement shown in FIG. 2a, the second output terminal 3b of the rectifier 3 is connected to the first terminal 4a of the converter 4. The second terminal 4b of the converter 4, the fourth terminal 4d of the converter 4 and the negative input terminal 1b of the battery 1 are connected to a common potential, e.g. a ground level. If the converter 4 is operated in a source mode, the terminals 4c, 4d are input terminals of the converter 4. In this case, the output voltage of the circuit arrangement, e.g. the battery voltage $U_{bat}$, is an input voltage of the converter 4. If the converter 4 is operated in a drain mode, the terminals 4c, 4d are output terminals of the converter 4. In this case, the output voltage of the circuit arrangement, e.g. the battery voltage $U_{bat}$, is equal to an output voltage of the converter 4.

The rectifier 3 can be an arbitrary rectifier known from the state of the art, e.g. a diode rectifier, a two-phase bridge rectifier or another rectifier.

In FIG. 2a and in FIG. 2b, a two-phase connection between the inductance 2 and the rectifier 3 is shown. It is to be understood that this does not constrain the scope of the invention. The inductance 2 and the rectifier 3 can also be connected by a three-phase connection e.g. if the inductance 2 generates a three-phase output voltage.

Figure 3:
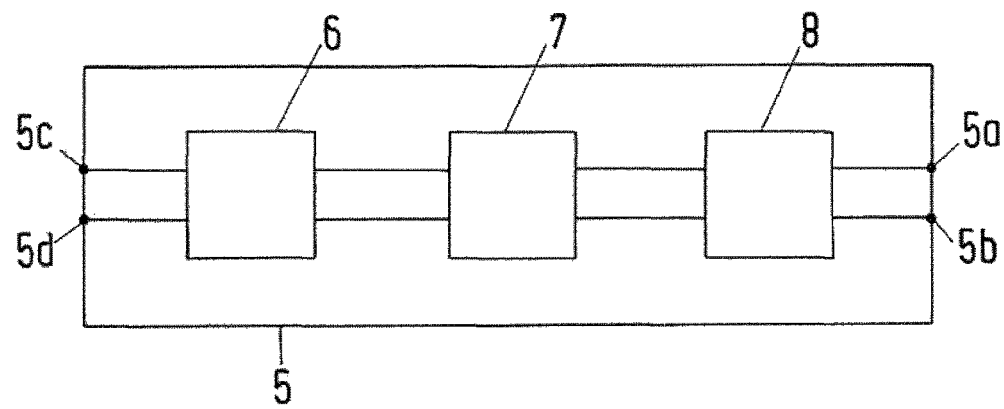

FIG. 3 shows a schematic block diagram of a resonance converter 5 which can be used as the converter 4 shown in FIGS. 2a, 2b. The resonant converter 5 comprises an inverter 6 for producing an intermediate alternating voltage from a constant input voltage which falls across a first input terminal 5c and a second input terminal 5d of the resonant converter 5. Furthermore, the resonant converter 5 comprises a transformer 7 which transforms the intermediate voltage at a given voltage level or at a given voltage amplitude to a transformed intermediate voltage with a desired voltage level or desired voltage amplitude. Furthermore, the resonant converter 5 comprises a rectifier 8 to rectify the transformed intermediate alternating voltage and to provide a constant output voltage which falls across a first output voltage terminal 5a of the resonant converter 5 and a second output terminal 5b of the resonant converter 5.

Figure 4:
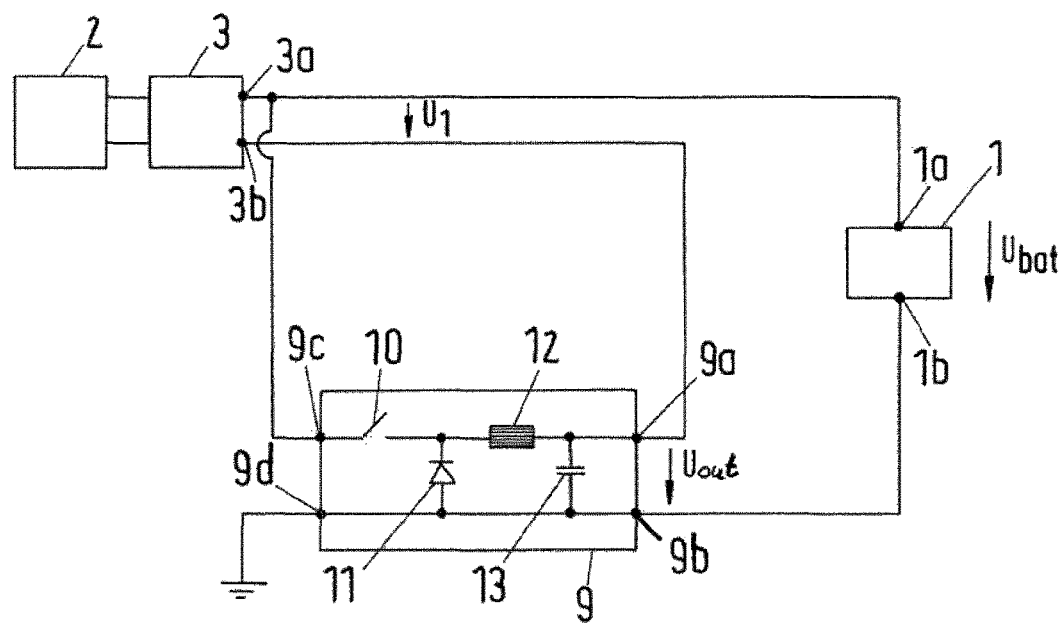

In FIG. 4 a schematic block diagram of a circuit arrangement using a step-down converter 9 is shown. It is shown that the step-down converter 9 comprises a switch 10, a diode 11, an inductance 12 and a capacitance 13, which are connected in a known manner. A third terminal 9c of the step-down converter 9 is connected to a first output terminal 3a of the rectifier 3. A first terminal 9a of the step-down converter 9 is connected to a second output terminal 3b of the rectifier 3. A positive input terminal 1a of the traction battery 1 is connected to the first output terminal 3a of the rectifier 3. A fourth terminal 9d of the step-down converter 9 is connected to ground. A second terminal 9b of the step-down converter 9 is connected to a negative input terminal 1b of the traction battery 1. A battery voltage $U_{bat}$ in this case is equal to a sum of the output voltage $U_1$ of the rectifier 3 and the output voltage $U_{out}$ of the step-down converter 9 if the step-down converter 9 is operated in a source mode.

Figure 5A:
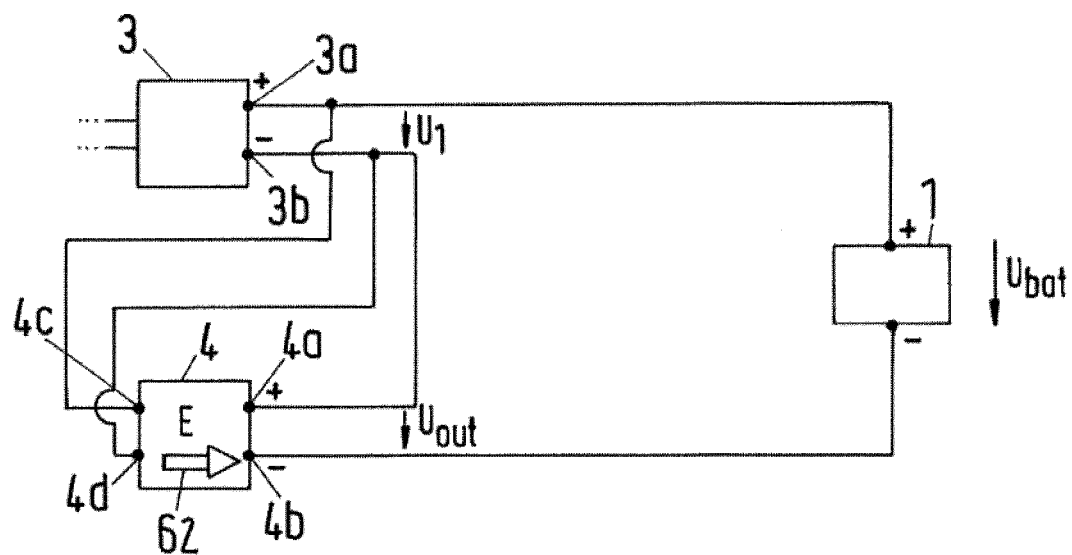

In FIG. 5a, a schematic operational diagram of the circuit arrangement shown in FIG. 2a with the voltage converter 4 being operated in a source mode is shown. It is shown that the first output terminal 3a of the rectifier 3 provides a higher potential than the second output terminal 3b of the rectifier 3. Therefore, the output voltage $U_1$ of the rectifier 3 is directed from the first output terminal 3a to the second output terminal 3b. In the source mode, a potential of the first terminal 4a is higher than a potential of the second terminal 4b. Therefore, the output voltage $U_{out}$ of the converter 4 is directed from the first terminal 4a to the second terminal 4b. An energy flow E is symbolized by an arrow 62. It is directed from an input side of the converter 4 to an output side of the converter 4. The input side is provided by the third and fourth terminal 4c, 4d of the converter 4 which are, in the source mode, input terminals. The output side is provided by the first and second terminal 4a, 4b of the converter 4 which are, in the source mode, output terminals. In FIG. 5a, the battery voltage $U_{bat}$ is equal to the sum of the output voltage $U_1$ of the rectifier 3 and the output voltage $U_{out}$ of the converter 4.

Figure 5B:
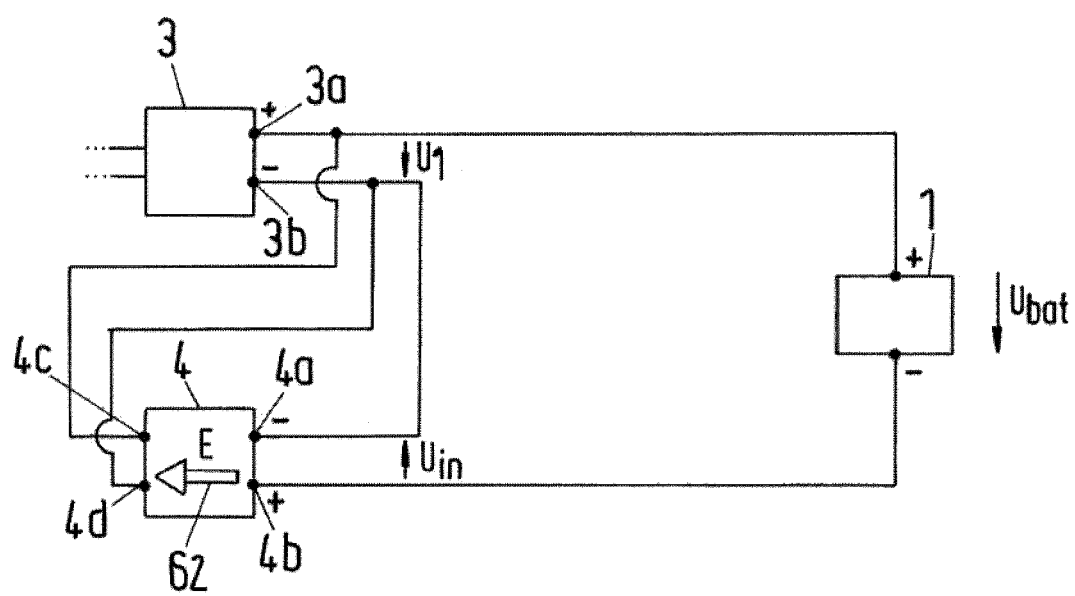

FIG. 5b shows a schematic operational diagram of the circuit arrangement shown in FIG. 2a with the voltage converter 4 being operated in a drain mode. In the drain mode, a potential of the second terminal 4b is higher than a potential of the first terminal 4a. Therefore, the input voltage $U_{in}$ of the converter 4 is directed from the second terminal 4b to the first terminal 4a. An energy flow E is symbolized by an arrow 62. It is directed from an input side of the converter 4 to an output side of the converter 4. The input side is now provided by the first and second terminal 4a, 4b of the converter 4 which are, in the drain mode, input terminals. The output side is provided by the third and fourth terminal 4c, 4d of the converter 4 which are, in the drain mode, output terminals. In FIG. 5b, the battery voltage $U_{bat}$ is equal to the difference between the output voltage $U_1$ of the rectifier 3 and the input voltage $U_{in}$ of the converter 4.

For the circuit arrangement shown in FIG. 5a and FIG. 5b, a configuration of the converter 4 can be chosen depending on a ratio of a desired output voltage of the circuit arrangement, e.g. the battery voltage $U_{bat}$, and the output voltage $U_1$ of the rectifier 3.

If, with reference to FIG. 5a, for all operational states of the circuit arrangement, e.g. for all possible output voltages $U_1$ of the rectifier 3, the desired output voltage of the circuit arrangement is higher than the output voltage $U_1$ of the rectifier 3 and the output voltage $U_1$ of the rectifier 3 is higher than or equal to a half of the desired output voltage of the circuit arrangement, the converter configuration has to be chosen such that the converter 4 is operable as a step-down converter. If, for all operational states of the circuit arrangement, the desired output voltage of the circuit arrangement is higher than the output voltage $U_1$ of the rectifier 3 and the output voltage $U_1$ of the rectifier 3 is lower than a half of the desired output voltage of the circuit arrangement, the converter configuration has to be chosen such that the converter 4 is operable as a step-up converter. If, for all operational states of the circuit arrangement, the desired output voltage of the circuit arrangement is higher than the output voltage $U_1$ of the rectifier 3 and the output voltage $U_1$ of the rectifier 3 fluctuates between values being higher than a half of the desired output voltage of the circuit arrangement and values being lower than a half of the desired output voltage of the circuit arrangement, the converter configuration has to be chosen such that the converter 4 is operable as both, a step-down converter or a step-up converter.

If, with reference to FIG. 5b, for all operational states of the circuit arrangement, the desired output voltage of the circuit arrangement is lower than the output voltage $U_1$ of the rectifier 3 and the output voltage $U_1$ of the rectifier 3 is lower than two times the desired output voltage of the circuit arrangement, the converter configuration has to be chosen such that the converter 4 is operable as a step-down converter.

If, for all operational states of the circuit arrangement, the desired output voltage of the circuit arrangement is lower than the output voltage $U_1$ of the rectifier 3 and the output voltage $U_1$ of the rectifier is equal to or higher than two times the desired output voltage of the circuit arrangement, the converter configuration has to be chosen such that the converter 4 is operable as a step-up converter.

If, for all operational states of the circuit arrangement, the desired output voltage of the circuit arrangement is lower than the output voltage $U_1$ of the rectifier 3 and the desired output voltage of the circuit arrangement fluctuates between values being higher than two times the desired output voltage of the circuit arrangement and values being lower than a two times the desired output voltage of the circuit arrangement, the converter configuration has to be chosen such that the converter 4 is operable as both, a step-down converter or a step-up converter.

It is to be denoted that the resonant converter 5 shown in FIG. 3 can be operated as a step-down or step-up converter. Preferably, the converter 4 is designed as a bidirectional buck-boost converter 4 which can be used in all of the previously described scenarios as well as in scenarios wherein the output voltage $U_1$ of the rectifier 3 fluctuates between values being higher than the desired output values of the circuit arrangement and values being lower than the desired output values of the circuit arrangement. The bidirectional converter 4 allows an energy E flowing in the directions shown in FIG. 5a and FIG. 5b (see arrows 62).

Figure 6A:
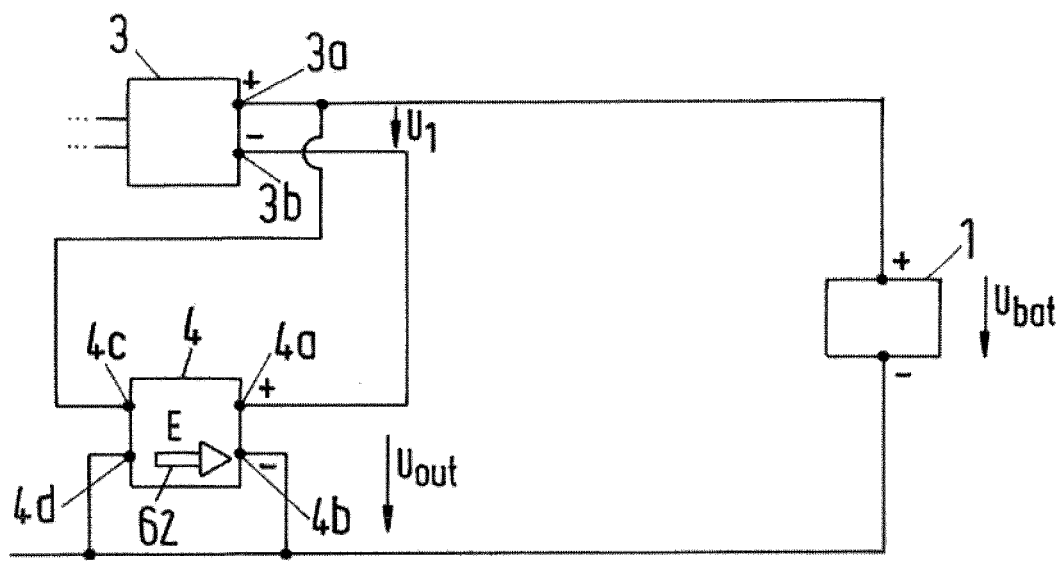

FIG. 6a shows a schematic operational diagram of the circuit arrangement shown in FIG. 2b with the voltage converter 4 being operated in a source mode. It is shown that the first output terminal 3a of the rectifier 3 provides a higher potential than the second output terminal 3b of the rectifier 3. Therefore, the output voltage $U_1$ of the rectifier 3 is directed from the first output terminal 3a to the second output terminal 3b. In the source mode, a potential of the first terminal 4a is higher than a potential of the second terminal 4b. Therefore, the output voltage $U_{out}$ of the converter 4 is directed from the first terminal 4a to the second terminal 4b. An energy flow E is symbolized by an arrow 62. It is directed from an input side of the converter 4 to an output side of the converter 4. The input side is provided by the third and fourth terminal 4c, 4d of the converter 4 which are, in the source mode, input terminals. The output side is provided by the first and second terminal 4a, 4b of the converter 4 which are, in the source mode, output terminals.

Figure 6B:
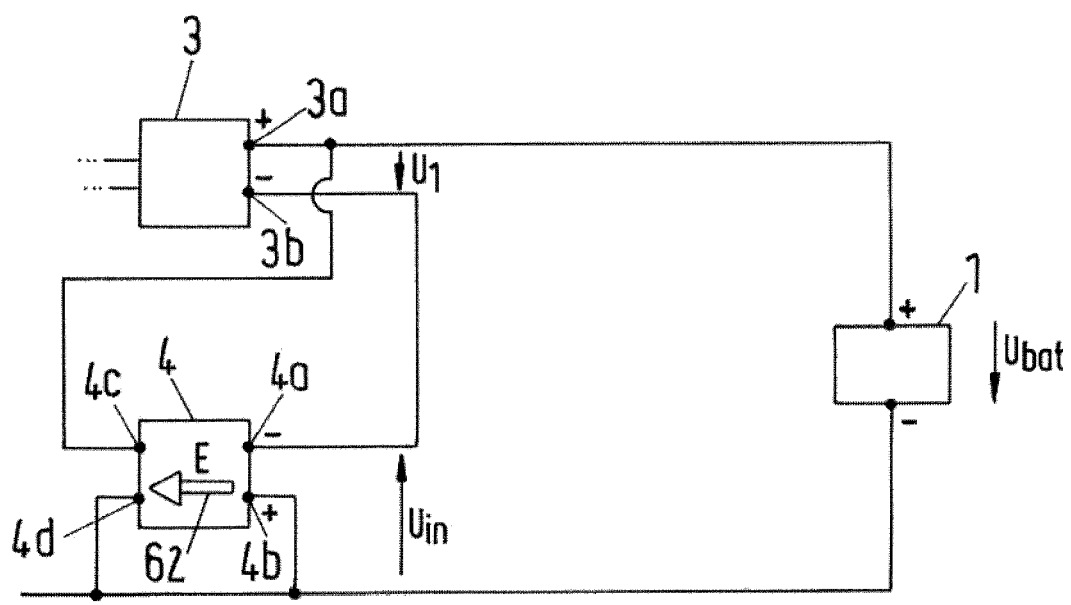

FIG. 6b shows a schematic operational diagram of the circuit arrangement shown in FIG. 2b with the voltage converter 4 being operated in a drain mode. In the drain mode, a potential of the second terminal 4b is higher than a potential of the first terminal 4a. Therefore, the input voltage $U_{in}$ of the converter 4 is directed from the second terminal 4b to the first terminal 4a. An energy flow E is symbolized by an arrow 62. It is directed from an input side of the converter 4 to an output side of the converter 4. The input side is now provided by the first and second terminal 4a, 4b of the converter 4 which are, in the drain mode, input terminals. The output side is provided by the third and fourth terminal 4c, 4d of the converter 4 which are, in the drain mode, output terminals.

According to the statements concerning FIG. 5a and FIG. 5b, a configuration of the converter 4 in the circuit arrangement shown in FIGS. 6a, 6b can be chosen depending on a ratio of a desired output voltage of the circuit arrangement, e.g. the battery voltage $U_{bat}$, and the output voltage $U_1$ of the rectifier 3. The input voltage of the converter 4 in the source mode is, in contrast to FIG. 5a, equal to the desired output voltage of the circuit arrangement, e.g. the battery voltage $U_{bat}$. The output voltage of the converter 4 in the drain mode is, in contrast to FIG. 5b, equal to the desired output voltage of the circuit arrangement, e.g. the battery voltage $U_{bat}$. This has to be considered when choosing the configuration of the converter 4.

Figure 7:
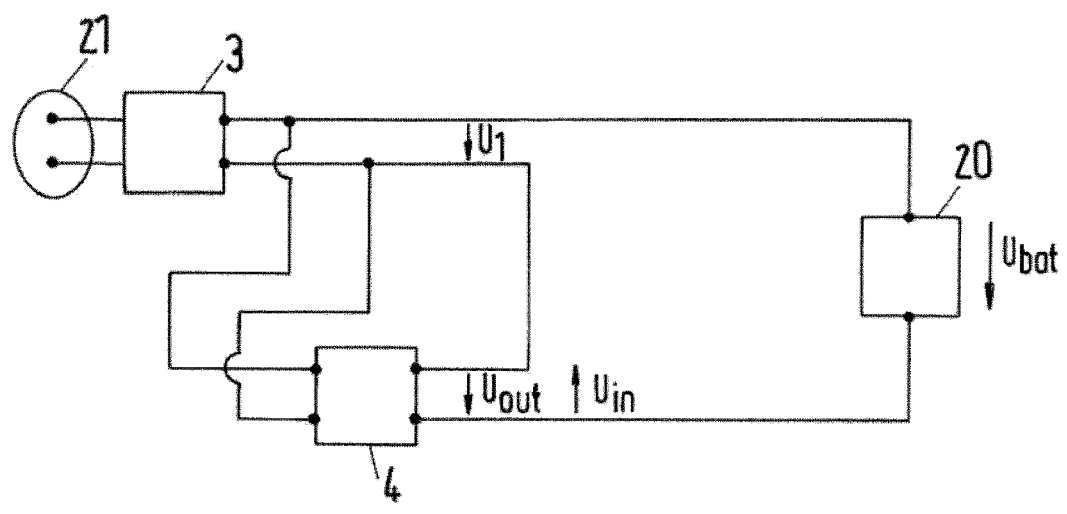

FIG. 7 shows a schematic block diagram of a charging circuit arrangement for a battery 20. The charging circuit arrangement comprises input terminals 21 for receiving an alternating input voltage. Furthermore, the charging circuit arrangement comprises a rectifier 3 and a voltage converter 4. The voltage converter 4 and the rectifier 3 are connected such that a battery voltage $U_{bat}$ is equal to a sum of the output voltage $U_1$ of the rectifier 3 and the output voltage $U_{out}$ of the voltage converter 4 if the converter 4 is operated in a source mode. If the voltage converter 4 is operated in a drain mode, the battery voltage $U_{bat}$ is equal to a difference between the output voltage $U_1$ of the rectifier 3 and the input voltage $U_{in}$ of the voltage converter 4. The rectifier 3 and the voltage converter 4 can be designed as disclosed with reference to FIG. 2a to FIG. 6b.

Figure 8:
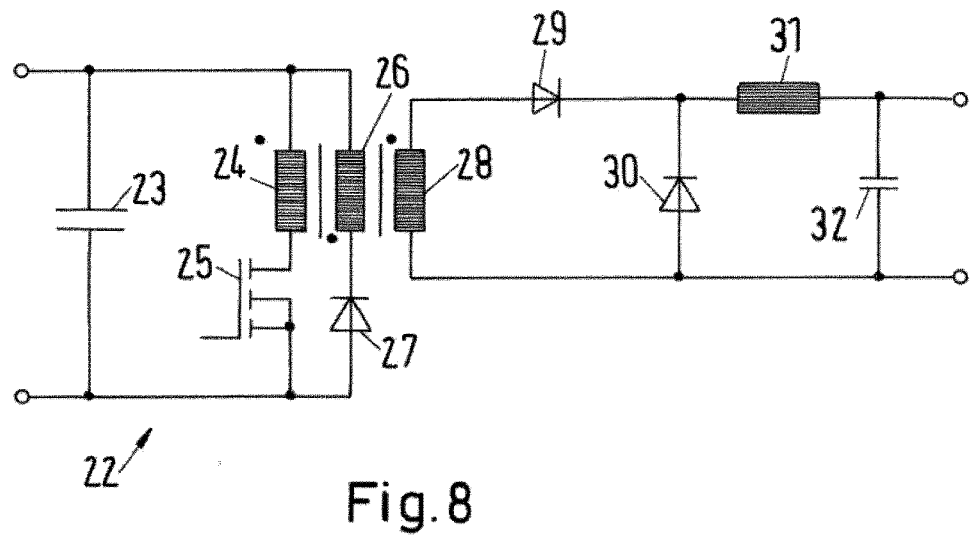

FIG. 8 shows a schematic block diagram of a first step-down converter 22 with galvanic separation which can be used instead of the step-down converter 9 shown in FIG. 4. The step-down converter 22 is also known as forward converter. On the primary side, the step-down converter 22 comprises an input capacitance 23, a primary winding 24, and a switching element 25, wherein a series connection of the primary winding 24 and the switching element 25 is connected in parallel to the input capacitance 23. The switching element 25 can be a transistor. Additionally, the primary side comprises a demagnetization winding 26 and a diode 27, wherein a series connection of the demagnetization winding 26 and the diode 27 is connected in parallel to the input capacitance 23. The secondary side comprises a secondary winding 28 and a secondary rectifier comprising diodes 29, 30. Furthermore, the secondary side comprises an inductance 31 and an output capacitance 32.

Figure 9:
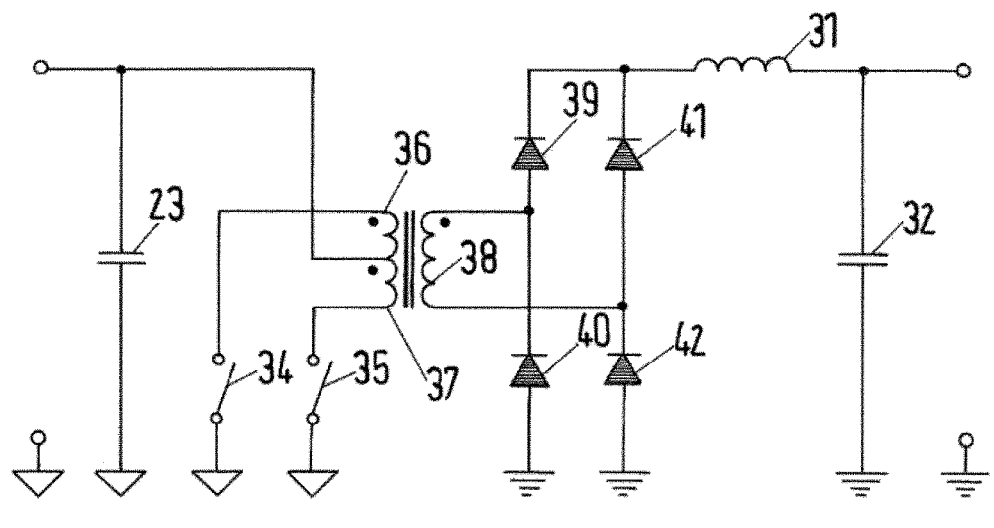

FIG. 9 shows a schematic block diagram of a second step-down converter 33 with galvanic separation which can be used instead of the step-down converter 9 shown in FIG. 4. The step-down converter 33 is also known as push-pull converter with a parallel power supply. On the primary side, the step-down converter 33 comprises an input capacitance 23, a primary winding, and switching elements 34, 35, wherein a circuit branch comprising the primary winding and the switching elements 34, 35 is connected in parallel to the input capacitance 23. The primary winding comprises a first winding element 36 and a second winding element 37 wherein a connection point of the winding elements 36, 37 is connected to the input capacitance 23 and the remaining terminals of the winding elements 36, 37 are connected to the switching elements 34, 35 respectively. The secondary side comprises a secondary winding 38 and a secondary rectifier comprising diodes 39, 40, 41, 42. Furthermore, the secondary side comprises an inductance 31 and an output capacitance 32.

Figure 10:
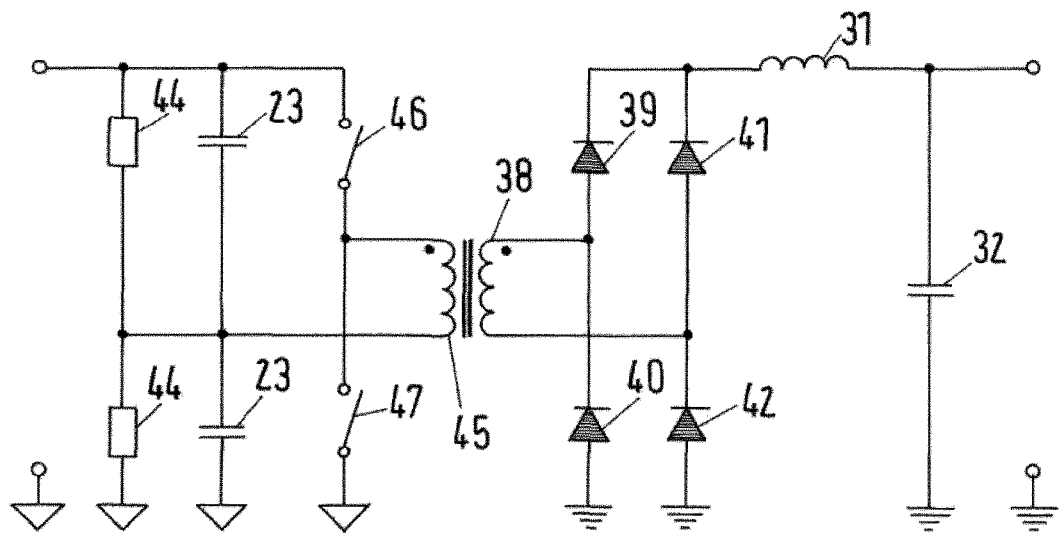

FIG. 10 shows a schematic block diagram of a third step-down converter 43 with galvanic separation which can be used instead of the step-down converter 9 shown in FIG. 4. The step-down converter 43 is also known as push-pull converter with a half-bridge control. On the primary side, the step-down converter 43 comprises input capacitances 23, input resistances 44, a primary winding 45, and switching elements 46, 47. A series connection of the input resistances 44 is connected in parallel to a series connection of the input capacitances 23 and a series connection of the switching elements 46, 47. One terminal of the primary winding 45 is connected to a connection point of the switching elements 46, 47, wherein another terminal of the primary winding 45 is connected to a connection point of the input capacitances 23 and a connection point of the input resistances 44. The secondary side of the step-down converter 43 equals the secondary side of the step-down converter 33 shown in FIG. 9.

Figure 11:
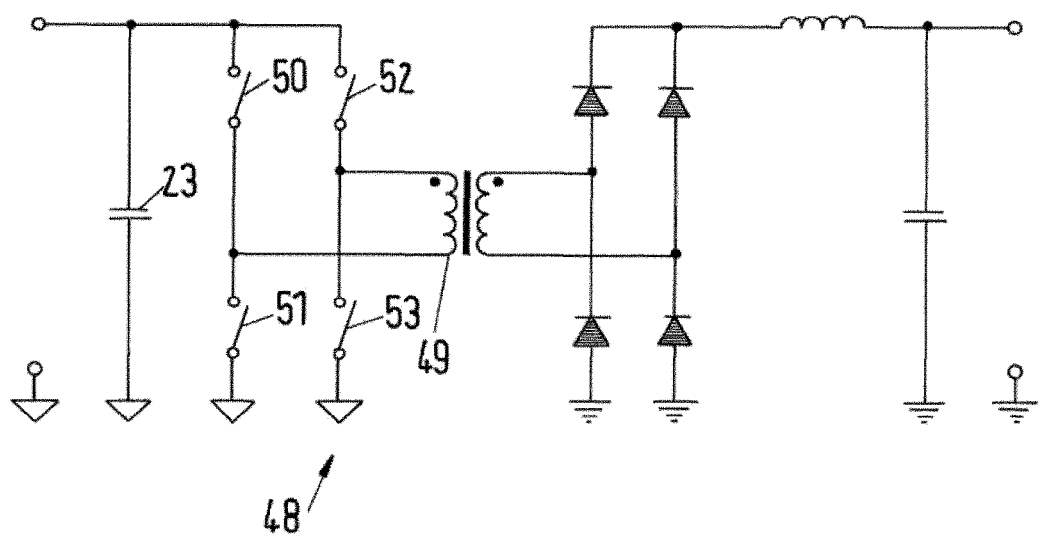

FIG. 11 shows a schematic block diagram of a fourth step-down converter 48 with galvanic separation which can be used instead of the step-down converter 9 shown in FIG. 4. The step-down converter 48 is also known as push-pull converter with a full-bridge control. On the primary side, the step-down converter 48 comprises an input capacitance 23, a primary winding 49, and switching elements 50, 51, 52, 53. A series connection of two switching elements 50, 51 is connected in parallel to a series connection of the other two switching elements 52, 53 and to the input capacitance 23. One terminal of the primary winding 49 is connected to a connection point of the switching elements 50, 51, wherein another terminal of the primary winding 49 is connected to a connection point of the other switching elements 52, 53. The secondary side of the step-down converter 43 equals the secondary side of the step-down converter 33 shown in FIG. 9.

Figure 12:
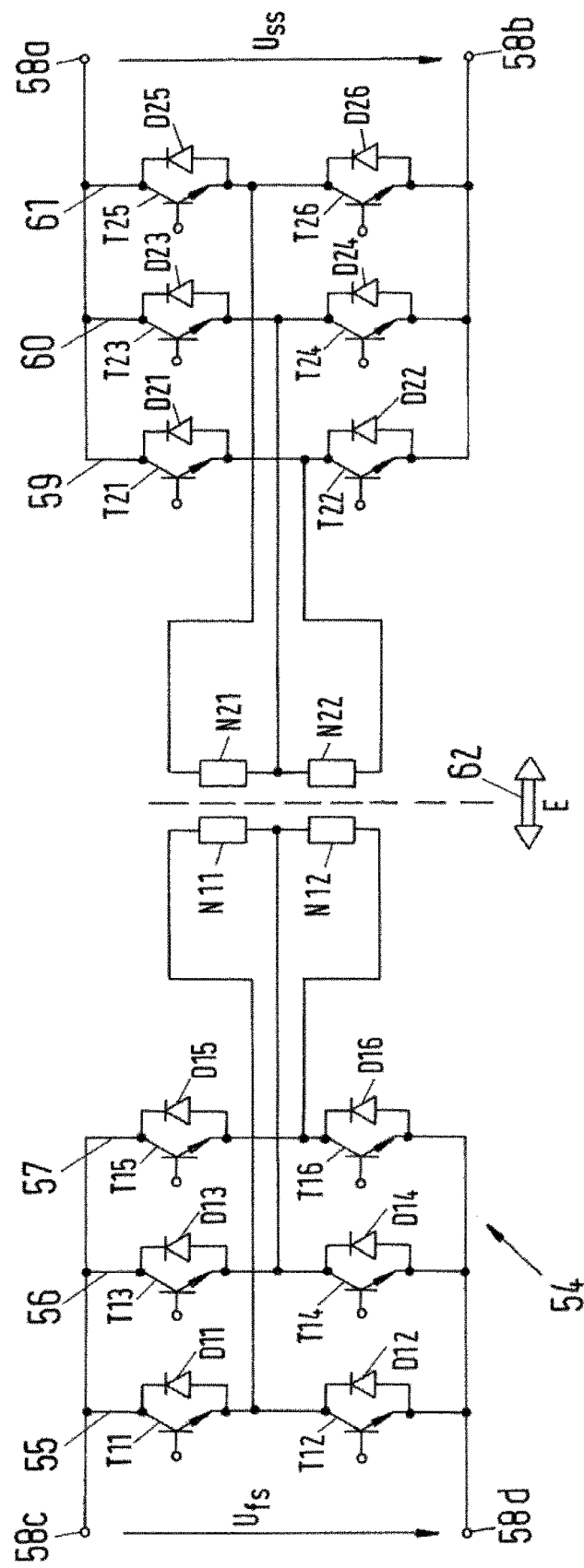

FIG. 12 shows a schematic block diagram of a universal converter 54 with galvanic separation. On a primary side, the universal converter 54 a first leg 55 which comprises a first switching element T11 and a second switching element T12, which are connected in series. Diodes D11, D12 are connected antiparallel to each switching element T11, T12. Correspondingly, the universal converter 54 comprises a second leg 56 which comprises a first switching element T13 and a second switching element T14, which are connected in series. Diodes D13, D14 are connected antiparallel to each switching element T13, T14. Correspondingly, the universal converter 54 comprises a third leg 57 which comprises a first switching element T15 and a second switching element T16, which are connected in series. Diodes D15, D16 are connected antiparallel to each switching element T15, T16. All legs 55, 56, 57 of the primary side are connected in parallel. Also, all legs 55, 56, 57 of the primary side are connected in parallel to connecting terminals 58c, 58d of the primary side of the universal converter 54.

On a secondary side, the universal converter 54 comprises a first leg 59 which comprises a first switching element T21 and a second switching element T22, which are connected in series. Diodes D21, D22 are connected antiparallel to each switching element T21, T22. Correspondingly, the universal converter 54 comprises a second leg 60 on the secondary side which comprises a first switching element T23 and a second switching element T24, which are connected in series. Diodes D23, D24 are connected antiparallel to each switching element T23, T24. Correspondingly, the universal converter 54 comprises a third leg 61 on the secondary side which comprises a first switching element T25 and a second switching element T26, which are connected in series. Diodes D25, D26 are connected antiparallel to each switching element T25, T26. All legs 59, 60, 61 of the secondary side are connected in parallel. Also, all legs 59, 60, 61 of the secondary side are connected in parallel to connecting terminals 58a, 58b of the secondary side of the universal converter 54.

The switching elements T11, . . . , T26 are designed as switching elements T11, . . . , T26 with a predetermined conducting direction. Antiparallel in this context means that the conduction direction of the diodes D11, . . . , D26 is oriented antiparallel to the conducting direction of the switching elements T11, . . . , T26.

Furthermore, the universal converter 54 comprises a first winding structure N11 and a second winding structure N12 on the primary side. The first winding structure N11 is electrically arranged between a connecting point of the first switching element T11 and the second switching element T12 of the first leg 55 of the primary side and a connecting point of the first switching element T13 and the second switching element T14 of the second leg 56 of the primary side. Correspondingly, the second winding structure N12 is electrically arranged between a connecting point of the second switching element T13 and the second switching element T14 of the second leg 56 of the primary side and a connecting point of the first switching element T15 and the second switching element T16 of the third leg 57 of the primary side.

Furthermore, the universal converter comprises a first winding structure N21 and a second winding structure N22 on the secondary side. The first winding structure N21 is electrically arranged between a connecting point of the first switching element T21 and the second switching element T22 of the first leg 59 of the secondary side and a connecting point of the first switching element T23 and the second switching element T24 of the second leg 60 of the secondary side. Correspondingly, the second winding structure N22 is electrically arranged between a connecting point of the second switching element T23 and the second switching element T24 of the second leg 60 of the secondary side and a connecting point of the first switching element T25 and the second switching element T26 of the third leg 61 of the secondary side.

It is important that the number of turns of all winding structures N11, N12, N21, N22 is equal.

The shown universal converter 54 is capable of transferring energy from the primary side to the secondary side and vice versa. An energy flow E (see arrow 62) can therefore be directed in both directions. Also or simultaneously, the universal converter can be operated as a step-down converter or step-up converter. This means that a voltage $U_{fs}$ which falls across the terminals 58c, 58d of the universal converter 54 can be converted to a higher or lower voltage $U_{ss}$ which falls across the terminals 58a, 58b of the universal converter 54. Also, a voltage $U_{ss}$ which falls across the terminals 58a, 58b of the universal converter 54 can be converted to a higher or lower voltage $U_{fs}$ which falls across the terminals 58c, 58d of the universal converter 54.

If the universal converter 54 is operated as a step-up converter which converts the voltage $U_{fs}$ falling across the terminals 58c, 58d of the primary side to a higher voltage $U_{ss}$ falling across the terminals 58a, 58b of the secondary side and an energy flow E is directed from the primary side to the secondary side, the switching elements T11, T12, T13, T14 of the first and second leg 55, 56 of the primary side are operated whereas the switching elements T15, T16 of the third leg 57 of the primary side are inactive. In this case, the switching elements T11, T12, T13, T14 of the first and second leg 55, 56 of the primary side are operated as a full-bridge inverter. In this case, a voltage ratio of $U_{fs}/U_{ss}=1:2$ can be achieved.

If the universal converter 54 is operated as a step-up converter which converts the voltage $U_{ss}$ falling across the terminals 58a, 58b of the secondary side to a higher voltage $U_{fs}$ falling across the terminals 58c, 58d of the primary side and an energy flow E is directed from the secondary side to the primary side, the switching elements T21, T22, T23, T24 of the first and second leg 59, 60 of the secondary side are operated whereas the switching elements T25, T26 of the third leg 61 of the secondary side are inactive. In this case, the switching elements T21, T22, T23, T24 of the first and second leg 59, 60 of the secondary side are operated as a full-bridge inverter. In this case, a voltage ratio of $U_{fs}/U_{ss}=2:1$ can be achieved.

If the universal converter 54 is operated as a step-down converter which converts the voltage $U_{fs}$ falling across the terminals 58c, 58d of the primary side to a lower voltage $U_{ss}$ falling across the terminals 58a, 58b of the secondary side and an energy flow E is directed from the primary side to the secondary side, the switching elements T11, T12, T15, T16 of the first and third leg 55, 57 of the primary side are operated whereas the switching elements T13, T14 of the second leg 56 of the primary side are inactive. In this case, the switching elements T11, T12, T15, T16 of the first and third leg 55, 57 of the primary side are operated as a full-bridge inverter. In this case, a voltage ratio of $U_{fs}/U_{ss}=2:1$ can be achieved.

If the universal converter 54 is operated as a step-down converter which converts the voltage $U_{ss}$ falling across the terminals 58a, 58b of the secondary side to a lower voltage $U_{fs}$ falling across the terminals 58c, 58d of the primary side and an energy flow E is directed from the secondary side to the primary side, the switching elements T21, T22, T25, T26 of the first and third leg 59, 61 of the secondary side are operated whereas the switching elements T23, T24 of the second leg 60 of the secondary side are inactive. In this case, the switching elements T21, T22, T25, T26 of the first and third leg 59, 61 of the secondary side are operated as a full-bridge inverter. In this case, a voltage ratio of $U_{fs}/U_{ss}=1:2$ can be achieved.

According to a desired operating mode, different switching elements T11, . . . T16, T21, . . . , T26 of the universal converter 54 are operated, e.g. clocked. The shown universal converter 54 can be used as the voltage converter 4 shown in FIG. 2a or FIG. 2b. In this case, the terminals 58c, 58d of the universal converter 54 correspond to terminals 4c, 4d of the voltage converter 4 and the terminals 58a, 58b of the universal converter 54 correspond to terminals 4a, 4b of the voltage converter 4 shown in FIG. 2a or FIG. 2b.

It is to be noted that the shown universal converter 54 and the previously described methods of operating the universal converter 54 can be subject of an independent invention.

The invention claimed is:

1. A circuit arrangement for providing a DC voltage in a vehicle, wherein the circuit arrangement comprises at least one secondary-sided inductance of a vehicle-sided pick-up portion for receiving a magnetic field and for producing an electric output voltage, at least one rectifier for rectifying the output voltage of the at least one inductance, and at least one source element or drain element,
wherein the rectifier and the source element are connected such that an output voltage of the circuit arrangement is a sum of an output voltage of the rectifier and an output voltage of the source element or the rectifier and the drain element are connected such that an output voltage of the circuit arrangement is a difference between an output voltage of the rectifier and an input voltage of the drain element, wherein the source element or the drain element are provided by a voltage converter, wherein the voltage converter transforms a direct current input voltage with a given level to a direct current output voltage with a desired level, wherein an output voltage of the circuit arrangement is equal to an input voltage of the source element or an output voltage of the drain element.

2. The arrangement of claim 1, wherein the output voltage of the rectifier is equal to an input voltage of the source element or an output voltage of the drain element.

3. The arrangement of claim 1, wherein an output of the rectifier is connected in series to an output of the source element or an input of the drain element.

4. The arrangement of claim 1, wherein a configuration of the voltage converter is chosen depending on a ratio of a desired output voltage of the circuit arrangement and the output voltage of the rectifier.

5. The arrangement of claim 1, wherein the voltage converter is designed as a bidirectional converter which is being operable as a buck-boost-converter.

6. The arrangement of claim 1, wherein the arrangement further comprises a traction battery, wherein the traction battery is connected to a voltage output of the circuit arrangement.

7. A vehicle comprising the circuit arrangement according to claim 1, wherein electric voltage produced by magnetic induction can be transformed by the circuit arrangement such that a desired DC voltage is provided.

8. A method of operating an electric circuit arrangement, wherein:
at least one secondary-sided inductance of a pick-up portion receives a magnetic field and produces an output voltage,
at least one rectifier rectifies the output voltage of the at least one secondary-sided inductance,
wherein at least one source element is operated such that a sum of an output voltage of the rectifier and an output voltage of the source element is regulated according to desired parameters or at least one drain element is operated such that a difference between an output voltage of the rectifier and an input voltage of the drain element is regulated according to desired parameters, wherein the source element or the drain element are provided by a voltage converter, wherein the voltage converter transforms a direct current input voltage with a given level to a direct current output voltage with a desired level, wherein an output voltage of the circuit arrangement is equal to an input voltage of the source element or an output voltage of the drain element.

9. The method of claim 8, wherein:
at least one voltage converter converts an input voltage of the voltage converter, and
the voltage converter is operated such that a sum of an output voltage of the rectifier and an output voltage of the voltage converter is regulated according to desired parameters or the voltage converter is operated such that a difference between an output voltage of the rectifier and an input voltage of the voltage converter is regulated according to desired parameters.

10. The method of claim 8, wherein the source element or the drain element are operated such that the output voltage of the circuit arrangement is regulated to a desired voltage level.

* * * * *